(12) United States Patent  
Alderson et al.

(10) Patent No.: US 8,277,719 B2  
(45) Date of Patent: Oct. 2, 2012

(54) PROCESS FOR THE PREPARATION OF AUXETIC FOAMS

(75) Inventors: Andrew Alderson, Liverpool (GB); Kim Lesley Alderson, Liverpool (GB); Philip John Davies, Lancashire (GB); Gillian Mary Smart, Bolton (GB)

(73) Assignee: Auxetic Technologies Ltd. (GB)

( * ) Notice: Subject to any disclaimer, the term of this patent is extended or adjusted under 35 U.S.C. 154(b) by 711 days.

(21) Appl. No.: 12/092,459

(22) PCT Filed: Nov. 6, 2006

(86) PCT No.: PCT/GB2006/004127  
§ 371 (c)(1),  
(2), (4) Date: Jul. 24, 2009

(87) PCT Pub. No.: WO2007/052054  
PCT Pub. Date: May 10, 2007

(65) Prior Publication Data  
US 2010/0029796 A1    Feb. 4, 2010

(30) Foreign Application Priority Data  
Nov. 4, 2005  (GB) .................................. 0522560.2

(51) Int. Cl.  
*B29C 67/20*    (2006.01)

(52) U.S. Cl. ......... 264/321; 264/45.6; 264/916; 264/41; 264/45.1; 264/46.1; 264/46.2; 264/48; 264/413; 264/414; 264/415; 264/42; 521/50; 521/50.5; 521/51; 521/52; 521/53; 521/54; 521/55; 521/56; 521/61; 521/63; 521/65; 521/73; 521/75; 521/76; 521/77; 521/78; 521/79; 521/82; 521/99; 521/134; 521/142; 521/151; 521/152; 521/153; 521/154; 521/155; 521/178; 521/180; 521/182; 521/186; 521/189

(58) Field of Classification Search .......... 264/413–415, 264/41, 42, 45.1–45.9, 46.1–46.9, 507, 663, 264/321, 664, 36.11, 45.6, 916, 48; 521/50, 521/50.5, 51, 52, 53, 54, 55, 56, 61, 63, 65, 521/73, 75, 76, 77, 78, 79, 82, 99, 134, 142, 521/151, 152, 153, 154, 155, 178, 180, 182, 521/186, 189  
See application file for complete search history.

(56) References Cited

U.S. PATENT DOCUMENTS 3,458,608 A * 7/1969 Cynoski et al. .............. 264/45.6  
2003/0042176 A1 * 3/2003 Alderson et al. ................ 209/17

* cited by examiner

*Primary Examiner* — Jeffrey Wollschlager  
*Assistant Examiner* — Stella Yi  
(74) *Attorney, Agent, or Firm* — Gary R. Jarosik

(57) ABSTRACT

A process for the preparation of thermoplastic auxetic foams comprising the steps of: a) taking conventional thermoplastic foam; b) subjecting said foam to at least one process cycle wherein the foam is biaxially compressed and heated; c) optionally subjecting the foam to at least one process cycle wherein the biaxial compression is removed and the foam mechanically agitated prior to reapplying biaxial compression and heating; d) cooling said foam to a temperature below the softening temperature of said foam; and e) removing said compression and heat.

21 Claims, 4 Drawing Sheets

PROCESS FOR THE PREPARATION OF AUXETIC FOAMS

The present invention relates to a process for the preparation of auxetic foams.

Auxetic materials, including foam, have a negative Poisson ratio whereby, when stretched in one direction by application of a tensile load, the material expands transversely to that direction. Alternatively, when compressed in one direction, the material contracts transversely to that direction.

Auxetic materials are available in the form of polymer gels, carbon fibre composites, honeycombs and microporous polymers.

Synthetic auxetic foams have been known since 1987. As described in WO88/00523, auxetic foams were prepared as open-celled polymeric foams. The negative Poisson ratio of these foams was obtained as a consequence of mechanical deformation of conventional foam by triaxial compression at a temperature above the softening temperature, followed by cooling below the softening temperature. Auxetic thermoplastic (polyester polyurethane), thermosetting (silicone rubber) and metal (copper) foams have been reported (E. A. Friis, R. S. Lakes, J. B. Park, *J. Mater. Sci.* 1988, 23, 4406).

Commonly available foam materials have a convex polyhedral cell shape. Conversion of these foam materials into auxetic foam materials is achieved by compressing the cell structure to a re-entrant and much more convoluted structure. The difference in the two cell structures can be seen in FIGS. 3a and 3b.

In the case of thermoplastic foams the transformation from conventional foam to auxetic foam is achieved by tri-axial compression followed by heating of the compressed foam to above the softening point. Finally the compressed foam is cooled.

In the case of thermosetting foams the processing route typically entails a two part elastomer base and catalyst mixture in accordance with conventional foaming techniques. The mixture is allowed to foam and set and then tri-axial compression is applied during curing.

The conversion in ductile metal foams typically takes place at room temperature and consists of applying uniaxial compression until yielding occurs. The final structure is then achieved by sequentially applying further compression in each of the three orthogonal directions.

The various processing routes for auxetic foams have been developed to allow scale-up to larger foam blocks (M. A. Luureiro, R. S. Lakes, *Cellular Polymers* 1997, 16, 349; N. Chan, K. E. Evans, *J. Mater. Sci.* 1997, 32, 5945).

It is also known to convert closed-cell polymer foams to an auxetic foam (E. O. Martz, T. Lee, R. S. Lakes, V. K. Goel, J. B. Park, *Cellular Polymers* 1996, 15, 229).

GB 2,347 096 and U.S. Pat. No. 4,668,557 disclose batch processes for the production of auxetic materials wherein open-cell foams are simultaneously heated and compressed in three orthogonal directions (triaxially) to thus provide auxetic materials.

Auxetic materials are of interest as a consequence of predicted enhancement of mechanical properties such as plane strain fracture toughness and shear modulus. Enhancements have been demonstrated in tests in terms of indentation resistance and ultrasound attenuation with blocks of auxetic microporous ultra high molecular weight polyethylene. Enhancements in hardness of up to three times at low loads, and very large enhancements (again up to three times) in the attenuation coefficient (i.e. how much of an ultrasound signal is absorbed) are exhibited as between auxetic and conventional polyethylene.

The auxetic effect of expanding when stretched has been shown to be useful in applications displaying enhanced anchoring or self-locking properties, such as an auxetic copper foam fastener device, and auxetic polymeric fibres embedded in polymeric resin displaying fibre-pull-out resistance and therefore, potentially of use as fibrous reinforcements in composites and as suture or muscle ligament anchors in biomedical applications.

Auxetic foams are found to be more resilient than the unconverted conventional foams. In addition, when they are subjected to a bending force auxetic foams undergo double (synclastic) curvature into a dome-like shape, rather than forming the saddle (anticlastic) shape adopted by non-auxetic materials. Hence auxetic foams and materials have potential as cushion materials: enhanced resilience giving improved comfort, and the double curvature ensuring mattresses, for example, provide optimal support for the 'doubly curved' human body.

The double curvature property of auxetic materials makes them ideal for curved body parts in the aerospace, automotive and marine applications such as nose cones for aircraft and formula one cars and boat hulls. The ability to form an auxetic plate material with double curvature negates the need for expensive, time-consuming, damaging and wasteful machining processes currently required when forming doubly-curved structures from conventional positive Poisson's ratio materials.

The high volume change associated with auxetic porous materials (e.g. foams and honeycombs) has been shown to lead to the development of filters having enhanced cleaning (de-fouling) or size-selectivity properties due to the large changes in pore size, shape and permeability associated with an auxetic material undergoing mechanical stretching or compression.

By definition, the combined tri-axial compression and heat process used to produce thermoplastic auxetic foams is a batch process. Batch processes are commercially disadvantageous as they are inefficient and include machine down time. Furthermore, it is necessary to repeat the aforesaid tri-axial process several times in order to produce auxetic foams of good quality. That is, foams without surface creases and which retain their shape, size and auxetic properties over a long time. These problems have severely limited the commercial development of auxetic foams.

Therefore, an object of the present invention is to provide a continuous process for the preparation of thermoplastic auxetic foams having the desired properties. The auxetic properties may be achieved in a single process step or multiple processing steps may be employed incorporating a means of agitating the foam to avoid rib adhesion which would otherwise tend to reduce the auxetic effect.

According to the present invention there is provided a process for the preparation of thermoplastic auxetic foams comprising the steps of:

a) taking conventional thermoplastic foam;
b) subjecting said foam to at least one process cycle wherein the foam is bi-axially compressed and heated;
c) optionally subjecting the foam to at least one further process cycle wherein the bi-axial compression and heating is removed and the foam is mechanically agitated prior to reapplying biaxial compression and heating;
d) cooling said foam to a temperature below the softening temperature of said foam; and
e) removing said compression and heat.

Advantageously, the process of the present invention allows the conversion of conventional thermoplastic foam to auxetic foam to be carried out in a continuous manner. Clearly, this is a more efficient, and therefore a more commercially viable process than the batch process currently employed. To the inventor's knowledge this is the first disclosure of a continuous production process for the manufacture of auxetic foams.

Furthermore, the bi-axial process of the present invention leads to the production of elastically anisotropic foams, including a significant increase in the stiffness (Young's modulus) along the length of the auxetic foam relative to the unconverted foam.

The ability to increase the stiffness of polymeric foams may lead to their deployment in load bearing applications where current polymeric foams are not adequate, such as improved cushioning materials and mattresses for support purposes. Introducing anisotropy into an auxetic foam in the form of increased stiffness along the length of the foam with respect to a reduced stiffness perpendicular to the length direction may find applications in filters in which the controlled opening of the filter pore structure due to the application of an applied stress (previously demonstrated to be enhanced through the auxetic effect) can be facilitated to a greater or lesser degree depending on the direction (and associated foam stiffness) in which the stress is applied to the foam filter. Another application for anisotropic auxetic foams could be as multifunctional free-layer damping materials. Ideally, such a material will have in-plane extensional damping properties (to damp flexural waves present in some substrate) and a low through-thickness compressional wave speed. This implies the material should have a high bending stiffness and a (relatively) low compressional modulus. Consequently, anisotropic foams are ideal candidate materials for consideration to achieve the biggest possible difference between the in-plane properties and the through-thickness properties.

Thermoplastic foam for use in the present invention may be commercially sourced or it may be made as part of the process such that its proportions can be tailored as appropriate. Any conventional thermoplastic foam is suitable for use in the process of the present invention, for example flexible polyurethane foam, polyesters such as polybutylene terephthalate and polyethylene terephthalate, or any foam made from a thermoplastic polymer selected from the group consisting of normally solid polymers of ethylene, propylene, butene-1, isobutene, vinyl chloride, vinylidene chloride, ethyl acrylate, methyl methacrylate, styrene, .alpha.-methyl-styrene, (t-butyl) styrene, ethyl cellulose, methyl cellulose, ethylene/vinyl acetate copolymer, ethylene/acrylic acid copolymer, ethylene/methyl methacrylate acid copolymer, ionomer salt of such acid copolymers, and blends thereof.

Preferably, the conventional thermoplastic foam is polyurethane.

Bi-axial compression may occur in any two of the x, y or z directions. Preferably, bi-axial compression occurs in the x and y directions i.e. not along the longitudinal axis.

Bi-axial compression is preferably achieved by inserting conventional foam into a mould having dimensions less than that of the foam such that a compression ratio of less than 1 is achieved. A compression ratio of less than 0.8 is preferred with a compression ratio of less than 0.7 being more preferred. For example, a foam block having dimensions of 25.6 mm×25.6 mm×76 mm is inserted into a tube having dimensions of 23 mm×23 mm×76 mm such that a compression ratio of 0.9 is achieved in the x and y directions. Preferably a compression ratio of 0.7 to 0.9 is applied.

The mould into which the foam is inserted is such that it forms a sleeve around the foam. The mould is preferably of a corresponding shape to the foam block (in cross section) and is preferably a tube.

The mould may be made of any suitable heat conducting material, but is preferably metallic. That said, the mould may be made of a heat insulating material providing that the material is sufficiently thin to allow efficient heat transfer to the foam when placed in the heating zone and yet possesses sufficient strength and stiffness to maintain the compression level on the foam.

The heating time and temperature are critical to the success rate. If the heating time is too short, the foam will not set. Therefore when the foam is taken out of the mould after heating it expands back to the original size. If the heating time is too long, the foam melts and the cell ribs stick together, therefore not opening up when tension is applied. Adopting a conversion temperature close to the softening temperature maximises stress relaxation and minimises cell rib adhesion. It has previously been shown that foams having smaller cell sizes need higher temperatures for shorter times in the conversion process and result in progressively less negative Poisson's ratios.

Heating of the foam material may be achieved by any suitable means, but is preferably achieved by way of a heating zone along at least part of the length of the mould.

The heating process is preferably performed at a temperature within ±20° C. of the softening temperature of the foam in order that the foam can be deformed during the compression process. Clearly, the softening temperature is dependent upon the type of thermoplastic foam used. One skilled in the art is aware of the softening temperatures of particular foams.

The heating time also varies depending upon the nature of the foam. One skilled in the art is aware of how to manipulate the heating time with a particular foam. The following is given by way of guidance only and is not intended to restrict the scope of the present invention.

S267 low density polyurethane foam required a temperature of 200° C. to be maintained for 10 minutes in order to achieve conversions. Following relaxation (agitation), the foam was heated at 200° C. for a further 10 minutes, followed by 30 minutes at 100° C.

SF305MDE and S245 low density polyurethane foams required longer conversion times. In these cases a temperature of 200° C. was employed to achieve conversion for an initial time of 15 minutes. Following relaxation, each of the foams were heated at 200° C. for a further 15 minutes, followed by 30 minutes at 100° C.

The heating process may be conducted prior to or following the compression process or at a point in the process where the compression and heating processes overlap. Preferably, the heating process is conducted simultaneously, or substantially simultaneously, with the compression process.

Following the heating and compression process the foam is then cooled preferably (in the mould) to a temperature substantially below the softening temperature of the foam to set the foam with the new foam structure and associated mechanical properties. Once again the particular softening temperature is foam specific.

The process of the present invention may optionally comprise an intermediate stage whereby the foam is briefly removed from the compression mould for 1 or 2 minutes and the foam gently agitated to ensure the ribs do not adhere to each other, prior to reapplying the biaxial compression and heating for a further period of time at the temperature around the softening point, may be employed prior to the final cooling stage. Preferably the agitation step is carried out at a temperature close to, or at, the softening temperature of the foam. The intermediate foam agitation stage may be repeated. The agitation stage may last from a few seconds (i.e. 2 seconds) to several minutes (i.e. 5 minutes) but preferably lasts 2 to 10 seconds. The foam may be removed from the mould only whilst the agitation step is carried out. Agitation may be achieved by any means which causes a degree of deformation of the foam. For example, mechanical means such as bars or rollers which deform the foam. The use of intermediate foam agitation and repeated biaxial compression around the softening temperature leads to a stabilisation of the auxetic properties over time, and a reduction in creasing of the surfaces of the foam.

The foam may be removed from the mould by any suitable means.

In order to facilitate removal of the foam from the mould a lubricant may be applied to the walls of the mould. Advantageously, the application of a lubricant to the walls of the mould produce foams having improved surface finishes (i.e. a further reduction in surface creasing features).

Auxetic foams in accordance with the present invention may be used as cushions and mattresses, vibration and sound damping materials, cleanable or variable size-selective filters and sieves (e.g. air filters), packaging components giving enhanced energy absorption and breathability properties, fastening devices to join two components together, shoe soles, synclastically curved sandwich panels, shock absorbing material, humidifier belts, sponges, gaskets, and as components of straps and pads in apparel and personal protective equipment applications to ensure improved fit and performance.

Preferably the foams used are flexible rather than rigid foams. The foam may be a non-polymeric foam.

Preferably the foams used in the present invention are open celled foams.

The use of the term conventional foams is a reference to the foams used in the invention being substantially non-auxetic foams.

Preferably when the process of the present invention is used the foams are preferably pushed and simultaneously pulled through the mould with the same degree of force, such that the foam is neither compressed or extended in the direction in which the bi-axial compression is not being applied.

The foams of the present invention are exclusively bi-axially compressed without compression in the other direction. The other direction preferably being the direction in which the foam body is: elongate, and/or progressing through the mould, and/or in the rise direction of the foam, and/or the direction corresponding to the open ends of the mould.

The invention will now be described further by way of example and with reference to the accompanying drawings in which.

Figure 4:
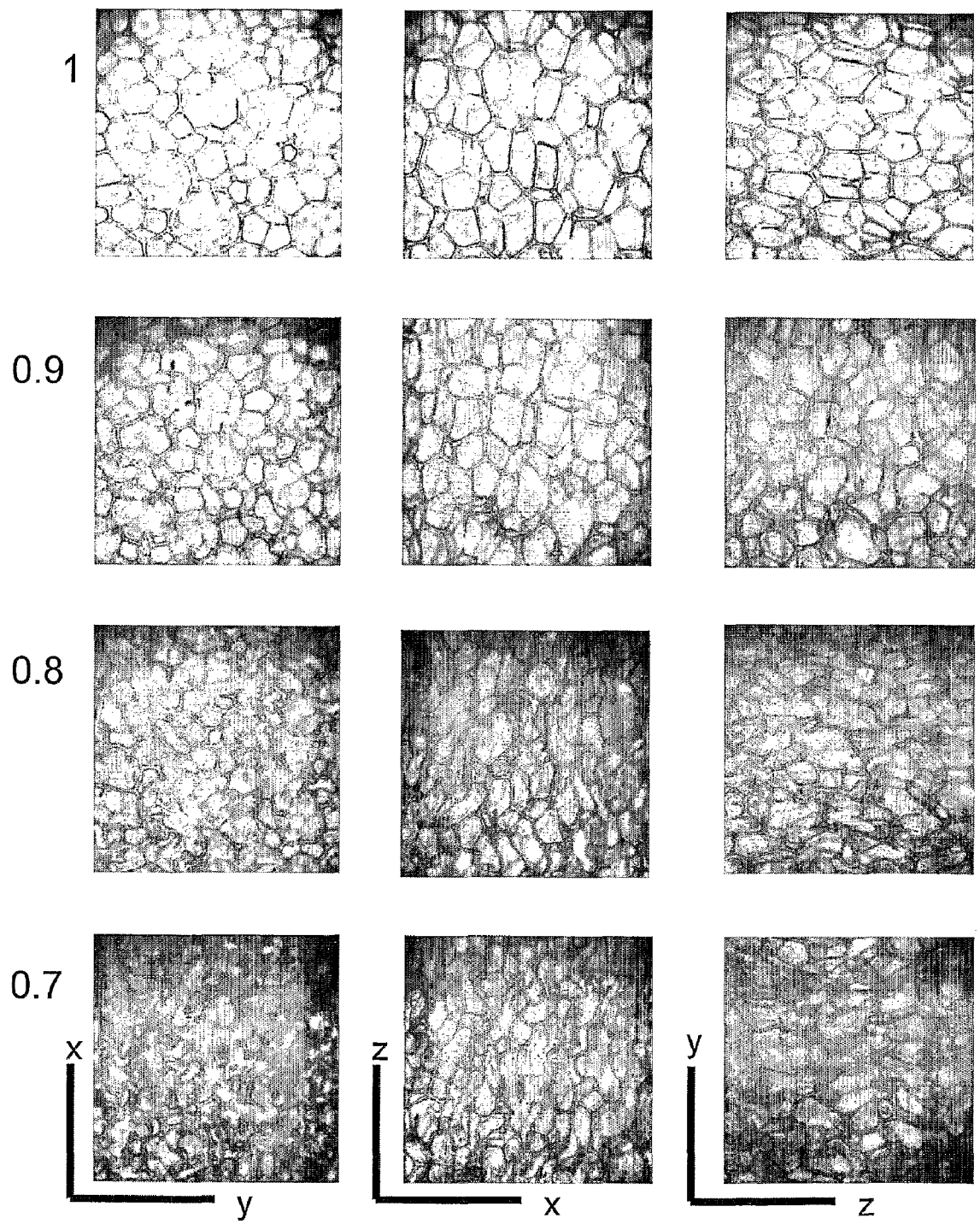
Figure 5:
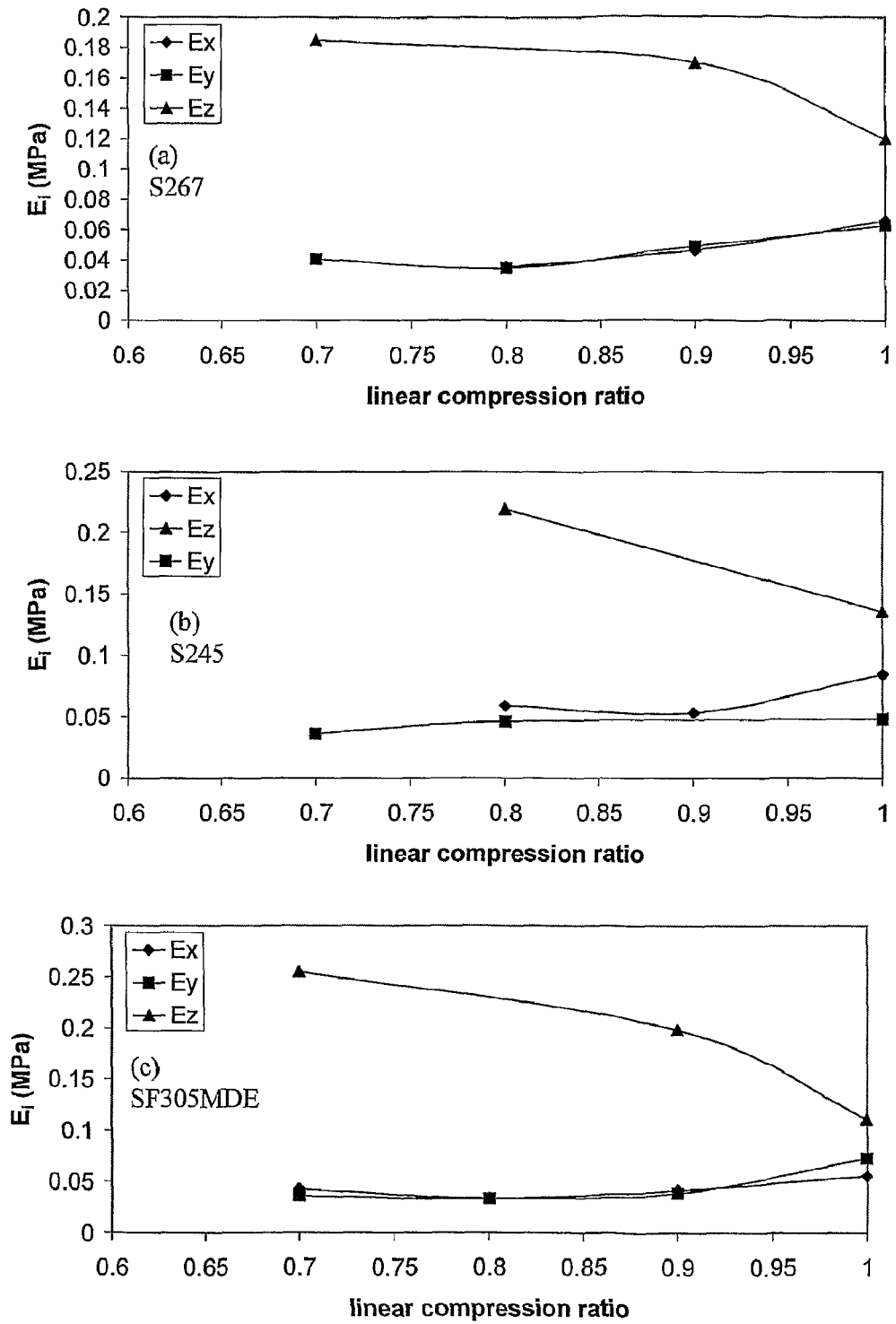
Figure 6:
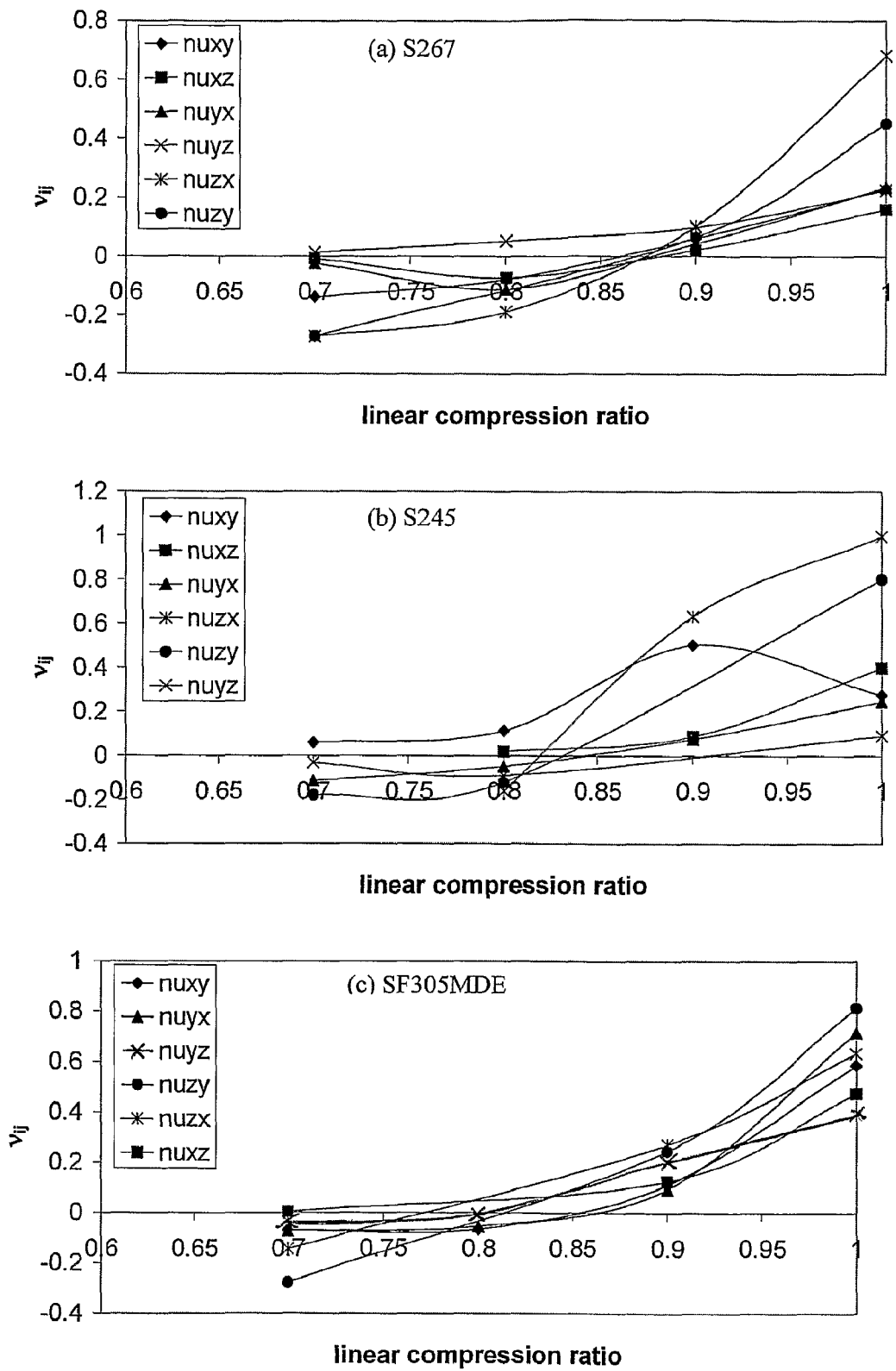

FIG. 4 is a series of microscopic images of foam following compression by way of various compression ratios and in accordance with the present invention FIG. 5 is a series of line graphs showing the tensile Young's modulus vs linear compression ratio for auxetic foams formed by the process of the present invention; and FIG. 6 is a series of line graphs showing tensil Poisson's ratio vs linear compression ratio for auxetic foams formed by the process of the present invention.

Figure 1:
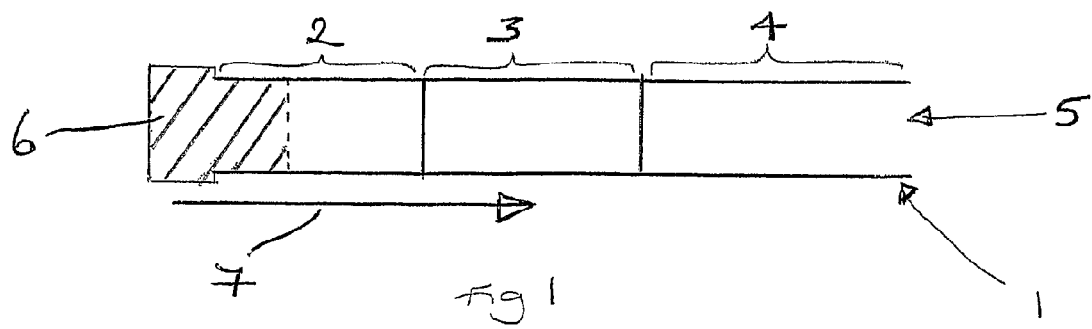
FIG. 1 is a diagrammatic representation of one form of apparatus used in performing the process of the present invention.

FIG. 1 shows a mould 1 comprising a first compression and heating zone 2, and a second compression and heating zone 4. The mould is open ended 5 such that no force is exerted on the foam in a y direction. The foam 6 travels through the mould in the direction shown by arrow 7.

More than one mould such as that shown in FIG. 1 can be arranged in series so as to form apparatus suitable for carrying out a continuous process. Alternatively, the apparatus can be made longer in order that all process operations can be performed in a single mould arrangement.

Figure 2:
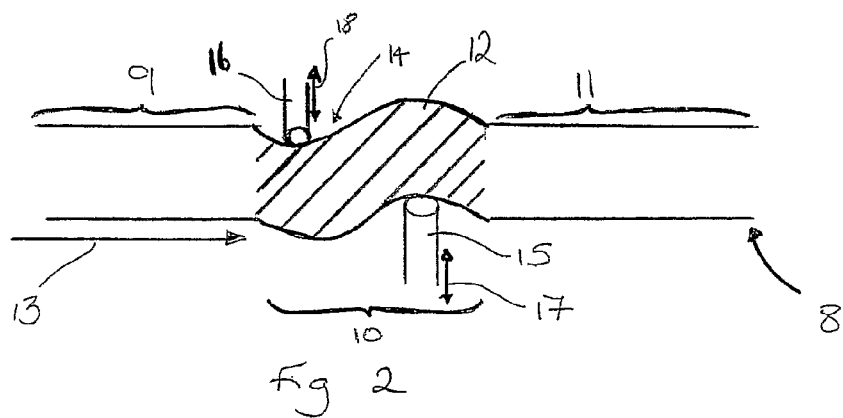
FIG. 2 is a diagrammatic representation of one form of apparatus used in performing the process of the present invention wherein the apparatus is configured so as to allow relaxation of the foam

FIG. 2 shows a mould 8 comprising a first compression zone and a heating zone 9, a relaxation zone 10 and a second compression and heating zone 11. The mould is open ended such that no force is exerted on the foam in a y direction. The foam 12 travels through the mould in the direction shown by arrow 13. The relaxation zone 10 is provided as a gap 14 between the first and second compression and heating zones 9 and 11, respectively. The relaxation zone 10 is provided with bars or rollers 15 and 16, respectively. Said bars are located on opposite sides of the apparatus. The bars are retractable as shown by arrows 17 and 18.

Figure 3A:
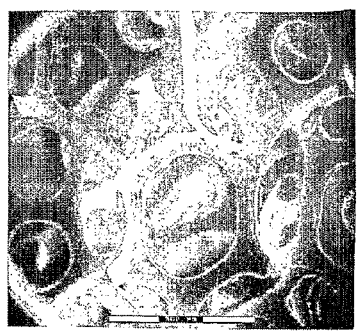
FIG. 3a is a microscopic image of conventional foam.
Figure 3B:
FIG. 3b is a microscopic image of the foam of FIG. 3a following tri-axial compression i.e. auxetic foam prepared by the method of the prior art.

FIG. 3a shows the open pore structure of a conventional foam. The pores are of regular shape and frequency within the foam and are of a similar size. In contrast the pores of the auxetic foam formed by the tri-axial compression method of the priori art (FIG. 3b) are distorted and have a random shape and distribution throughout the foam.

EXAMPLES

Three low density polyurethane foams were provided by Recticel, designated by S267, S245 and SF305MDE. These foams have a characteristic 'rise' direction along which the pores are elongated slightly during the foaming process. The rise direction of each foam block was, therefore, confirmed optically and defined to be the z direction.

Bi-axial compression was achieved by inserting unconverted foams into a metallic tube of square internal cross-section 23 mm×23 mm and 76 mm in length. No end tabs were secured over the free ends and so no compressive strain was applied along the length of the foam. The compression ratios for the foam dimensions perpendicular to the length of the foam were achieved by cutting unconverted foam blocks of appropriately larger dimensions than the mould (e.g. 0.9 linear compression ratio was achieved by cutting an unconverted foam block of dimensions 25.6×25.6×76 mm). The foam rise direction was aligned along the length of the mould.

Table 1 contains the initial dimensions of the inconverted foams, and the applied linear compression and extension ratios (and corresponding volumetric compression ratios) used in the conversions according to the above scenario.

TABLE 1

| Unconverted foam dimensions (mm) | | | Applied linear compression or extension ratios | | | |
|---|---|---|---|---|---|---|
| X | Y | Z | X | Y | Z | V/V$_0$ |
| 23 | 23 | 76 | 1 | 1 | 1 | 1 |
| 25.6 | 25.6 | 76 | 0.9 | 0.9 | — | >0.81 |

TABLE 1-continued

| Unconverted foam dimensions (mm) | | | Applied linear compression or extension ratios | | | |
|---|---|---|---|---|---|---|
| X | Y | Z | X | Y | Z | V/V$_0$ |
| 28.75 | 28.75 | 76 | 0.8 | 0.8 | — | >0.64 |
| 32.86 | 32.86 | 76 | 0.7 | 0.7 | — | >0.49 |

For the S267 polyurethane foam a temperature of 200° C. was employed for all the conversions for an initial time of 10 minutes. The foams were then removed and relaxed. The foams were then reinserted into the appropriate conversion rigs at 200° C. for a further 10 minutes, followed by 30 minutes at 100° C.

The SF305MDE and S245 foams required longer times for the 200° C. conversions. In these cases a temperature of 200° C. was employed to achieve all the conversions for an initial time of 15 minutes. The foams were then removed and relaxed. Then, the foams were reinserted into the appropriate conversion rigs at 200° C. for a further 15 minutes, followed by 30 minutes at 100° C.

The apparatus suitable for carrying out the process of the present invention may be a single rig having several zones such that the foam can be converted without removal from the rig or it may comprise several small rigs connected in series. In either embodiment the rig(s) of the present invention may provide an apparatus which enables the process of the present invention to be conducted in a continuous manner.

FIG. 4 shows the effect of bi-axial compression conversion (x and y directions) at linear compression ratios of 0.9, 0.8 and 0.7 on the S267 foam viewed perpendicular to the z, y and x directions. The effect here is progressive crumpling of the pores in the x-y plane and pore elongation (along z) followed by crumpling (at 0.7 linear compression ratio) in the x-z and y-z planes.

The Poisson's ratios were obtained from the slope of the linear best fit line to the average of the transverse strain versus longitudinal strain data for the middle 4 of 10 transverse sections measured by videoextensometry to minimise edge effects associated with the 3 transverse sections at each end of the foam sample. The slope of the graph gives $-v_{ij}$, where i is the direction of loading and j is the width direction.

The Young's moduli were obtained for all the foams in the usual manner by multiplying the slope of the force against extension graph by the foam length divided by the cross-sectional area.

FIGS. 5 and 6 show the Young's modulus and Poisson's ratio trends, respectively, as a function of linear compression ratio for the bi-axial compression converted foams. The foams become increasingly anisotropic with increasing bi-axial compression. The Young's modulus in the z direction actually (unexpectedly) increases (by up to a factor of 2 on the unconverted value):

TABLE 2

| Maximum Young's moduli in z direction (MPa) | | | | | |
|---|---|---|---|---|---|
| S267 foam | | S245 foam | | SF305MDE foam | |
| Un-converted | Converted | Un-converted | Converted | Un-converted | Converted |
| 0.12 | 0.18 | 0.14 | 0.22 | 0.11 | 0.25 |

The values shown in table 2 are much higher than the values obtained after triaxial compression conversion, where the Young's modulus decreases with increasing triaxial compression and the foams tend toward elastic isotropy (i.e. the Young's moduli in the x, y and z directions assume similar values). On the other hand, the Young's moduli in the x and y directions decrease (by up to a factor of 2) with increasing bi-axial compression.

There is almost universal auxetic behaviour at linear compression ratios 0.7 and 0.8 for the bi-axial compression converted foams. Typically, the values are around v=0 to −0.2, and comparable with the range for tri-axial compression converted S245 and SF305MDE foams.

It is thought that under the bi-axial compression (in the x and y directions) conversion route, pore elongation along z is followed by buckling of the cell walls. This is likely to lead to an initial increase in the Young's modulus along z as the pore elongates in this direction and also a positive-to-negative Poisson's ratio transformation as the cells adopt a re-entrant geometry due to the buckling effect at the higher bi-axial compression levels.

The uniaxial compression of foam samples failed to provide materials which exhibited auxetic behaviour. The uniaxial compression was carried out by compressing the foam samples between two metal plates along the rise (z) direction.

It is of course to be understood that the present invention is described by way of example only and is not intended to be restricted to the foregoing examples.

The previously disclosed examples relate to thermoplastic foams. However, the present invention for the production of anisotropic auxetic foam materials may also be applied to thermosetting foams and metallic foams.

To achieve the transformation in thermosetting foams the processing entails mixing a two-part elastomer base and catalyst mixture as per the conventional foaming technique. The mixture is allowed to foam and set and then biaxial compression is applied during curing.

To achieve the transformation in ductile metal foams a uni-axial compression is applied (at room temperature) in one of the directions perpendicular to the rise direction until yielding occurs. A further compression is then applied in the other orthogonal direction perpendicular to the rise direction to arrive at the final structure giving rise to auxetic behavior.

The invention claimed is:

1. A process for the preparation of thermoplastic auxetic foams from conventional thermoplastic foams comprising the steps of:
    a) taking conventional thermoplastic foam;
    b) subjecting said foam to at least one process cycle wherein the foam is biaxially compressed and heated to a temperature close to the softening temperature;
    c) optionally subjecting the foam to at least one process cycle wherein the biaxial compression is removed and the foam mechanically agitated prior to reapplying biaxial compression and heating;
    d) cooling said foam to a temperature below the softening temperature of said foam; and
    e) removing said compression and heat.

2. A process as claimed in claim 1 wherein the biaxial compression is applied in the x and y directions.

3. A process as claimed in claim 1 wherein the biaxial compression is not applied in the rise direction of the foam.

4. A process as claimed in claim 1 wherein the biaxial compression is achieved by the use of a tube shaped mould(s) such that a compression ratio of less than 1 is applied.

5. A process as claimed in claim 4 wherein a compression ratio of less than 0.8 is applied.

6. A process as claimed in claim 4 wherein a compression ratio of less than 0.7 is applied.

7. A process as claimed in claim 4 where in the mould is a corresponding shape (in cross-section) to the shape of the foam (in cross-section).

8. A process as claimed in claim 1 wherein the foam is heated to a temperature within +/−20° C. of the softening temperature of the foam during the compression stage(s).

9. A process as claimed in claim 1 wherein a foam is heated to 200° C. for 10 minutes, the foam is then mechanically agitated at a temperature within +/−20° C. of the softening temperature of the foam, subsequently heated at 200° C. for a further 10 minutes and then heated at 100° C. for 30 minutes.

10. A process as claimed in claim 1 wherein a foam is heated at 200° C. for 15 minutes, the foam is then mechanically agitated at a temperature within +/−20° C. of the softening temperature of the foam, subsequently heated at 200° C. for 15 minutes and then heated at 100° C. for 30 minutes.

11. A process as claimed in claim 1 wherein the foam is inserted into a mould that forms a sleeve around the foam and wherein a lubricant is applied to the walls of the mould.

12. A process as claimed in claim 1 wherein the process is carried out as a continuous process.

13. A process as claimed in claim 1 wherein the biaxial compression is removed and the foam mechanically agitated for a period of time of 2 seconds to 5 minutes prior to the reapplication of the biaxial compression and heating.

14. An auxetic foam manufactured according to the process of claim 1.

15. An auxetic foam as claimed in claim 1 wherein the foam is a thermoplastic foam chosen from the group comprising flexible polyurethane, polyesters or a blend thereof.

16. An auxetic foam manufactured according to the process of claim 1 wherein the foam is a thermoplastic polyester foam and wherein the polyester is chosen from the group comprising: polybutylene terephthalate and polyethylene terephthalate.

17. An auxetic foam manufactured according to the process of claim 1 wherein the foam is a thermoplastic foam made from a thermoplastic polymer selected from the group comprising: polymers of ethylene, propylene, butene-1, isobutene, vinyl chloride, vinylidene chloride, ethyl acrylate, methyl methacrylate, styrene, .alpha.-methyl-styrene, (t-butyl) styrene, ethyl cellulose, methyl cellulose, ethylene/vinyl acetate copolymer, ethylene/acrylic acid copolymer, ethylene/methyl methacrylate acid copolymer, ionomer salt of such acid copolymers, and blends thereof.

18. An auxetic foam manufactured according to the process of claim 1 wherein the foam is a polyurethane.

19. A filter comprising an auxetic foam manufactured according to the process of claim 1.

20. A cushioning material comprising an auxetic foam manufactured according to the process of claim 1.

21. A clamping material comprising an auxetic foam manufactured according to the process of claim 1.

* * * * *